United States Patent [19]

Dusza

[11] 4,422,861
[45] Dec. 27, 1983

[54] AEROSOL FILTER CARTRIDGE

[75] Inventor: Robert J. Dusza, Southbridge, Mass.

[73] Assignee: American Optical Corporation, Southbridge, Mass.

[21] Appl. No.: 345,955

[22] Filed: Feb. 5, 1982

[51] Int. Cl.³ ............................................ B01D 46/52
[52] U.S. Cl. .................................... 55/498; 55/502; 55/505; 55/510; 55/511; 55/521; 55/524; 55/DIG. 35
[58] Field of Search ............................. 55/491–492, 55/497–498, 502, 505, 511, 521, DIG. 33, DIG. 35, 510, 524

[56] References Cited

U.S. PATENT DOCUMENTS

| | | | |
|---|---|---|---|
| 2,505,173 | 4/1950 | Conley. | |
| 2,640,481 | 6/1953 | Conley. | |
| 2,744,524 | 5/1956 | Whipple. | |
| 3,076,555 | 2/1963 | Jackson et al. | 55/497 X |
| 3,293,830 | 12/1966 | McKinlay | 55/498 X |
| 3,803,817 | 4/1974 | Lewis | 55/498 |
| 3,865,919 | 2/1975 | Pall et al. | 55/502 X |
| 3,870,495 | 3/1975 | Dixson et al. | 55/497 X |
| 4,294,599 | 10/1981 | Grovesteen et al. | |

FOREIGN PATENT DOCUMENTS

| | | | |
|---|---|---|---|
| 650432 | 10/1962 | Canada | 55/510 |
| 778682 | 3/1935 | France | 55/510 |
| 808833 | 2/1937 | France | 55/498 |

Primary Examiner—Kathleen J. Prunner
Attorney, Agent, or Firm—Kenway & Jenney

[57] ABSTRACT

A circular array of accordian pleated filter material is core and edge sealed, placed in a supporting shell, peripherally sealed thereinplace and capped. Core sealing of the array of filter material is accomplished with a fill of hot melt adhesive and edge sealing with application of a covering strip of the same or a similar hot melt adhesive. An overlay of heat shrinkable tape provides final tight sealing and rigidification of the structure.

10 Claims, 5 Drawing Figures

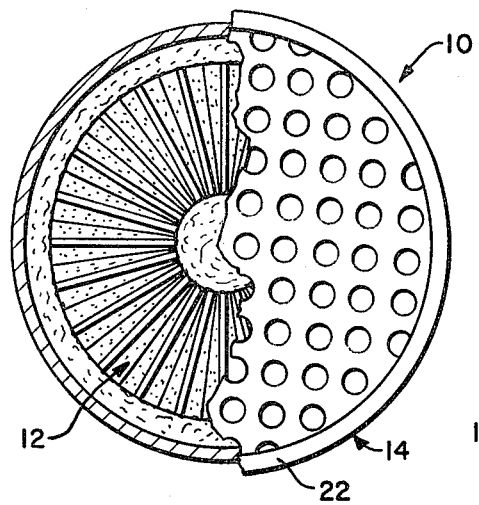
FIG. 1
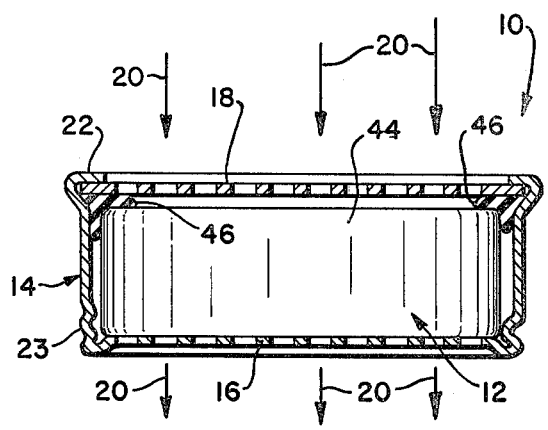
FIG. 2
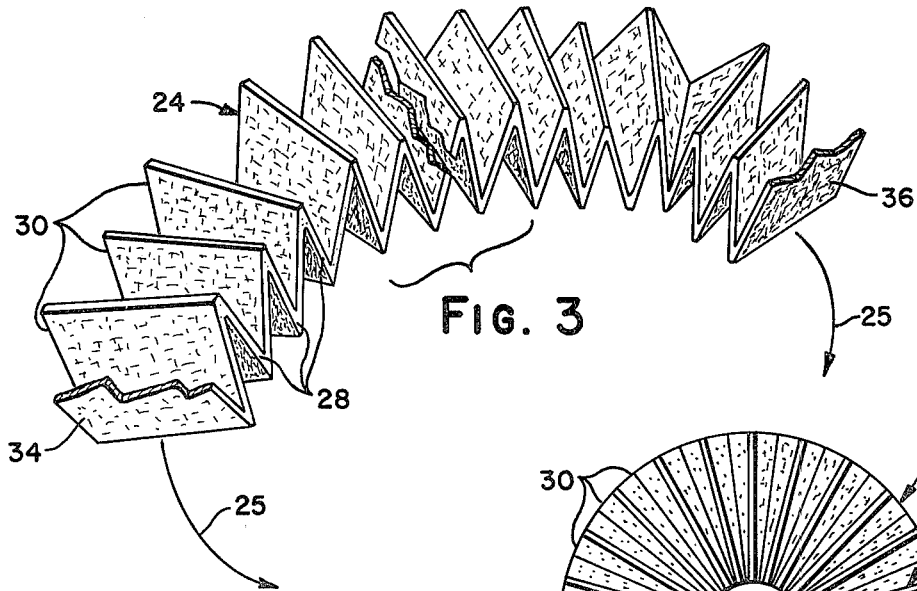
FIG. 3
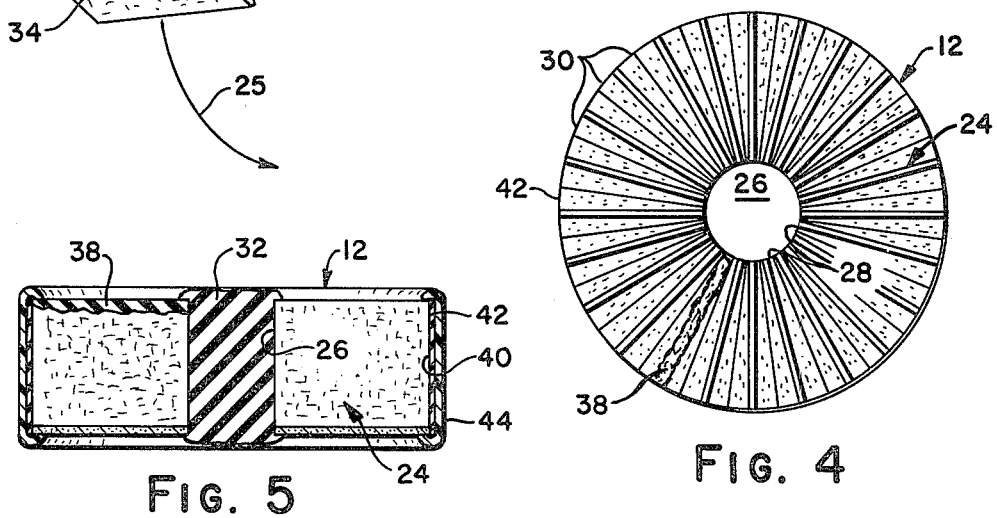
FIG. 5
FIG. 4

AEROSOL FILTER CARTRIDGE

BACKGROUND OF THE INVENTION

1. Field of the Invention

This invention relates to filter cartridges for respirators and has particular reference to improvements in cartridges designed for protection against aerosols.

2. Description of the Prior Art

Aerosol cartridges traditionally employ multiple component filtering systems, e.g. combinations of variously designed glass fiber and wool pads or fillers which, not uncommonly, offer undesirable resistance to air flow (breathing) during use and lend complication and costliness to manufacture.

While improved breathing resistance has been accomplished with a special multicomponent filter design according to U.S. Pat. No. 4,294,599, there remains the need for simplification of structure and further lessening of breathing resistance without sacrifice of filter efficiency and/or bulkiness of final cartridge configuration.

Accordingly, a principal object of this invention is to accomplish greater ease of air flow through aerosol filter cartridges with simplification of construction and increased economy of manufacture.

More specifically, there is the objective of minimizing cartridge components and simplifying assembly thereof.

Other objects and advantages of the invention will become apparent from the following description.

SUMMARY OF THE INVENTION

Objects and advantages of the invention are accomplished with provision of a strip of accordian pleated aerosol filtering paper formed into a circular body with edges of the pleats opening into the core area of the body and similarly opening outwardly about its periphery. The core area is filled with a hot melt adhesive for sealing corresponding pleat openings and a hot melt strip is wrapped about peripheral openings with an overlay of a heat shrinkable tape for sealing the outermost openings. heat applied to the wrapped body provides tight sealing of its edges and rigidification of the structure for ease of its handling in assembly with a supporting respirator cartridge shell. This assembly procedure includes dropping the heat sealed filter structure into an open respirator cartridge shell, sealing the space between the filter structure and shell with a bead of hot melt adhesive and conventionally capping the shell.

Details of the invention will become apparent from the following description when taken in conjunction with the accompanying drawings in which:

FIG. 1 is a partially cross-sectioned plan view of a preferred embodiment of the invention;

FIG. 2 is a partially cross-sectioned side view of the filter cartridge of FIG. 1;

FIG. 3 is an illustration, in perspective, of a length of filter material used to form the air filtering component of the cartridge;

FIG. 4 is a plan view of the filtering component in partially finished form; and FIG. 5 is a cross-sectional view of the filtering component as finished according to the invention.

DESCRIPTION OF THE PREFERRED EMBODIMENTS

Referring to the drawings, filter cartridge 10 comprises filter component 12 contained in shell 14 of stamped, drawn or otherwise formed sheet metal, e.g. aluminum, or molded plastic. The bottom 16 and cover 18 of shell 14 are perforated to permit passage of air through filter 12 for respirator breathing in the direction of arrows 20. cover 18 is conventionally crimped in place by rolled edge 22 of the shell. External threads 23 are provided for connecting cartridge 10 to a respirator facemask with cover 18 exposed to the particular environment against which respiratory protection is sought. Perforated bottom 16 is thereby disposed interiorly of the facepiece and provides the user with a source of filtered air. Those interested in details of a respirator facemask which will serve the above purpose may refer to U.S. Pat. Nos. 2,505,173; 2,640,481; and/or 2,744,524.

Filter component 12 is formed of an initially elongated accordian pleated strip 24 of aerosol filter material, e.g. a filter paper composed of microglass borosilicate fiber resin binder. Suitable paper materials commercially identified as HD-2024; HD-2064; and HD-2065 may be obtained from Hollings-worth and Vose Company, East Walpole, Mass. USA.

A strip 24 approximately 0.875 inch wide and 7 to 8 feet long with approximately 1 inch pleats is formed to the circular configuration of FIG. 4 by bringing opposite ends thereof toward each other and together as indicated by arrows 25. As shown in FIG. 4, this form of filter component 12 has an approximate 2.75 inch diameter with a core 26 of approximately ¾" diameter. At this stage, open ends 28 and 30 of the pleated array of paper 24 are exposed in the core 26 and about the edge of component 12 of FIG. 4. Core 26 is filled with hot melt 32 (FIG. 5) sealing all adjacent open ends 28 of filter 12. Adjoining opposite ends 34 and 36 of strip 24 are also sealed with a bead 38 of hot melt (FIGS. 4 and 5).

The term "hot melt" is herein intended to include any suitable non-volatile adhesive made of synthetic resins and plasticizers applied hot in molten state. A desirable commercially available non-toxic melt product is Terlan ® Compound No. 2103 manufactured and supplied by the Terrell Corporation, Wilmington, Mass., USA.

Completion of the filter component 12 includes application of a strip 40 of hot melt about edge 42. Strip 40 covers the full height of component 12, i.e. extending completely over open ends 30 thereof and may be of various thicknesses, preferably in the order of from 0.025 to 0.035 inch.

Wrapped around hot melt strip 40 is heat shrinkable tape 44, e.g. of polyethylene. The two, i.e. strip 40 and tape 44, may be placed one against the other for simultaneous application to component 12. Alternatively, tape 44 may be precoated with hot melt 40 for the above purpose.

Following taping, component 12 is heated (e.g. to within the range of 325° F. to 375° F.) for softening of the hot melt and sealing of adjacent outermost openings in component 12 along with shrinking of tape 44 which assists the sealing by tightening against edge 42 and, at the same time, rigidifies the thus finally formed structure of filter component 12.

Filter component 12 is next placed in shell 14 with the surrounding open space sealed by a bead 46 of hot melt adhesive.

Cover 18 is then applied with edge 22 of the shell rolled over for permanent cover fixation.

From the foregoing, it can be seen that objects and advantages of the invention have been accomplished.

The cartridge structure is of simple construction and efficiently manufactured. It comprises a single filter component easily constructed and readily assembled with a receiving shell. It is a self-contained easily handled unit also adaptable to storage without the shell.

It should be understood, however, that various modifications and adaptations of the form of the invention described above may be made to meet particular requirements and, accordingly, all modifications which incorporate the novel concept disclosed are to be construed as coming within the scope of the following claims or range of equivalency to which they are entitled.

I claim:

1. A filter for a respirator cartridge, said filter comprising:
    an encirclement of an accordian pleated filter medium with opposite ends joined and providing an open core area so as to define open internal and external edges of pleating of said encirclement;
    first adhesive means sealing together said joined opposite ends of said encirclement of filter medium;
    second adhesive means filling said core area as a seal for said internal open edges of said pleating;
    third adhesive means extending about said external open edges of pleating for covering and sealing said external open edges of said pleating, said third adhesive means comprising a hot melt adhesive strip;
    a layer of heat shrinkable material overlying said third adhesive means; and
    said third adhesive means and said layer of heat shrinkable material being respectively heat softened and heat shrunken tightly against said encirclement of pleated filter medium so as to effect positive sealing of said external open edges of said pleated medium and rigidifying of said encirclement of filter medium.

2. A filter according to claim 1 wherein said filter medium is a filter paper and said first and second adhesives are hot melts.

3. A filter according to claim 2 wherein said heat shrinkable material is a polyethylene tape.

4. A filter according to claim 1 further including an open ended shell into which said encirclement of filter medium is loosely positioned, there being space between said encirclement of filter medium and shell.

5. A filter according to claim 4 wherein said space between said encirclement of filter medium and shell is closed and sealed adjacent one end of said open ended shell.

6. A filter according to claim 5 wherein said closing and sealing of said space is accomplished with a continuous bead of adhesive material.

7. A filter according to claim 6 further including a cover extending over another end of said open ended shell.

8. A filter according to claim 6 wherein said cover and said closed one end of said shell are perforated to permit passage of air therethrough.

9. A filter according to claim 8 wherein said shell, said filter medium and said cover comprise a respirator cartridge component, said component including means for its adaptation to a respirator facepiece.

10. A filter according to claim 9 wherein said means for adapting said cartridge component to a respirator facepiece comprises external threads adjacent one of said ends of said shell.

* * * * *